United States Patent
Bodin

(10) Patent No.: US 8,382,199 B2
(45) Date of Patent: Feb. 26, 2013

(54) ENERGY ABSORBING SIDE RAIL FOR A VEHICLE

(75) Inventor: Hans Bodin, Sodra Sunderbyn (SE)

(73) Assignee: Gestamp Hardtech AB, Lulea (SE)

( * ) Notice: Subject to any disclaimer, the term of this patent is extended or adjusted under 35 U.S.C. 154(b) by 0 days.

(21) Appl. No.: 13/138,827

(22) PCT Filed: Apr. 20, 2010

(86) PCT No.: PCT/SE2010/000102
§ 371 (c)(1),
(2), (4) Date: Oct. 4, 2011

(87) PCT Pub. No.: WO2010/126423
PCT Pub. Date: Nov. 4, 2010

(65) Prior Publication Data
US 2012/0025548 A1  Feb. 2, 2012

(30) Foreign Application Priority Data
Apr. 28, 2009 (SE) .................................. 0900567

(51) Int. Cl.
*B62D 25/08* (2006.01)

(52) U.S. Cl. ............. 296/204; 296/187.11; 296/187.09; 280/784

(58) Field of Classification Search ................. 296/204, 296/193.07, 187.03, 187.08, 187.1, 187.11, 296/187.09; 293/133, 155; 280/784
See application file for complete search history.

(56) References Cited

U.S. PATENT DOCUMENTS

| 5,431,445 A * | 7/1995 | Wheatley ........................ 280/784 |
| 5,492,207 A | 2/1996 | Clausen |
| 6,820,924 B2 | 11/2004 | Caliskan et al. |
| 6,994,350 B2 * | 2/2006 | Krajewski et al. ....... 296/187.03 |
| 2002/0104591 A1 | 8/2002 | Gehringhoff et al. |
| 2010/0084892 A1 | 4/2010 | Yoshida et al. |

* cited by examiner

*Primary Examiner* — Dennis Pedder
(74) *Attorney, Agent, or Firm* — Mark P. Stone

(57) ABSTRACT

A side rail for vehicles has a tensile strength in excess of 1400 MPa and has one end (16) projecting from the safety cage of the vehicle and adapted to carry a bumper. The end projecting from the safety cage has lower strength with a yield point of less than 1000 MPa over a length of at least 0.4 m. It has an outer portion with a length of at least 0.2 m and a tensile strength below 800 MPa and an inner portion with a higher tensile strength than the outer portion.

4 Claims, 1 Drawing Sheet

ENERGY ABSORBING SIDE RAIL FOR A VEHICLE

FIELD OF THE INVENTION

The invention relates to a side rail for vehicles having a tensile strength in excess of 1400 MPa, said side rail having one end projecting from the safety cage of the vehicle and adapted to carry a bumper.

PRIOR ART

Vehicles, e.g. passenger cars, generally have side rails both at the front and at the rear welded to the bottom panel of the vehicle, these side rails carrying the bumper. U.S. Pat. No. 6,820,924 B2 describes a passenger car with a front side rail for carrying the bumper, this side rail having a plurality of narrow, soft portions which are supposed to act as deformation triggers for axial deformation of the side rail in the event of a collision. The soft portions trigger deformation of the hard portions.

OBJECT OF INVENTION AND BRIEF DESCRIPTION OF THE INVENTION

The aim of the invention is to allow for controlled deformation resulting in high energy absorption even in the case of side rails made of high-strength steel. This is achieved in that the end of the side rail projecting from the safety cage has lower strength with a yield point of less than 1000 MPa over a length of at least 0.4 m. The projecting end advantageously has an outer portion with a length of at least 0.2 m and a tensile strength below 800 MPa and an inner portion with a higher tensile strength than the outer portion. Both the inner portion and the outer portion may include two or more portions with a tensile strength gradually increasing inwards the vehicle.

The invention is defined by the claims.

DESCRIPTION OF THE EXAMPLE OF THE INVENTION SHOWN

Figure 1:
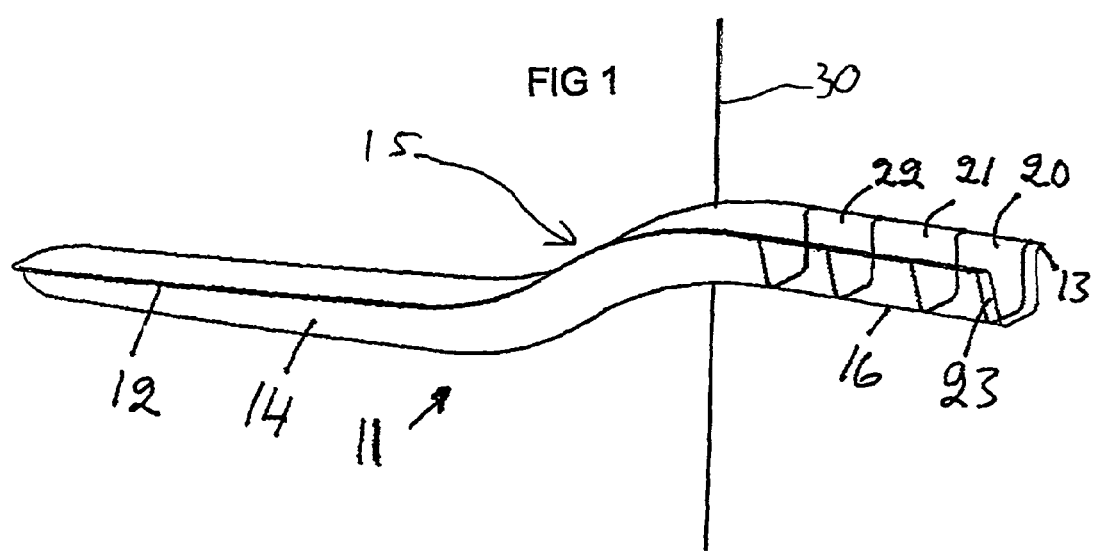
FIG. 1 is a perspective view showing a short side rail for a vehicle.

FIG. 1 is a perspective view showing a short front side rail with an open U-shaped cross section and narrow side flanges 12, 13. The side rail is attached to the vehicle in that the side flanges 12, 13 of the rear portion 14 are welded to the bottom panel of the vehicle, i.e. to the floor of the vehicle or to members on the underside thereof. As a pair of side rails is supposed to carry a bumper, the side rail has an S-bend 15 so that its front end will be at the correct height for the bumper. The end of the side rail may advantageously have a welded end plate (not shown) and the bumper can be bolted to this plate. A vehicle has what is referred to as a safety cage (schematically illustrated by reference numeral 30) and deformation zones in front of and behind the safety cage. The safety cage normally extends from the cowl wall at the front end of the vehicle and past the fuel tank at its rear end. The rear portion 14 of the side rail and its S-bend 15 belong to the safety cage, whereas the front portion 16 of the side rail belongs to the front deformation zone.

The side rail is made of high-strength steel and can advantageously be manufactured by press hardening, i.e. a flat blank is heated to austenitising temperature and is moved in the heated state to a cooled tool pair where it is hot-stamped and then left in the tool pair for a few seconds until it has hardened. This method results in tensile strengths of more than 1400 MPa. Rapid cooling and therefore full hardening of specific portions of the product can be prevented in various ways, e.g. by providing gaps between the tool pair and the finished product or by heating selected portions of the otherwise cooled tool pair.

In the event of impact, e.g. in the event of a collision, high-strength steel tends to crack when it is deformed and the front portion 16 of the side rail shown in FIG. 1 has three portions 20, 21, 22 which are softer, i.e. which have lower strength than the rest of the side rail. The portion 20 has the lowest strength, the portion 21 has higher strength and the portion 22 has even higher strength. The portion 22 has a tensile strength below 1000 MPa. The portion 16 has a breaking strength below 1000 MPa, i.e. significantly lower strength than the rest of the side rail, over a length of 0.4 m. The outermost end of the portion 16 may consist of a high-strength portion 25 with a tensile strength in excess of 1400 MPa. In total, the side rail has a tensile strength below 800 MPa over a length of at least 0.2 m.

In the event of a collision axially towards the end of the side rail, the softest portion 20 will be deformed first and absorb impact energy. Only once this portion has been deformed will the portion 21 begin to be deformed and once the portion 21 has been deformed, the portion 22 will begin to be deformed.

The outermost end 25 of the side rail may be of high-strength as shown so as to counteract deformation in the event of low-speed collisions where the wish is for no damage at all to the side rails.

Short transition zones are formed between the portions 20, 21, 22. Alternatively, there may be short high-strength zones between the portions 20, 21, 22 and short transition zones are then formed on either side of the high-strength zones.

As a result of the fact that the S-bend 15 is made of high-strength steel and the front end 16 of the side rail has softer portions, the S-bend is not deformed until the soft portions have been deformed. The possibility of having a side rail with an S-bend made of high-strength steel simplifies the design of the vehicle.

Figure 2:
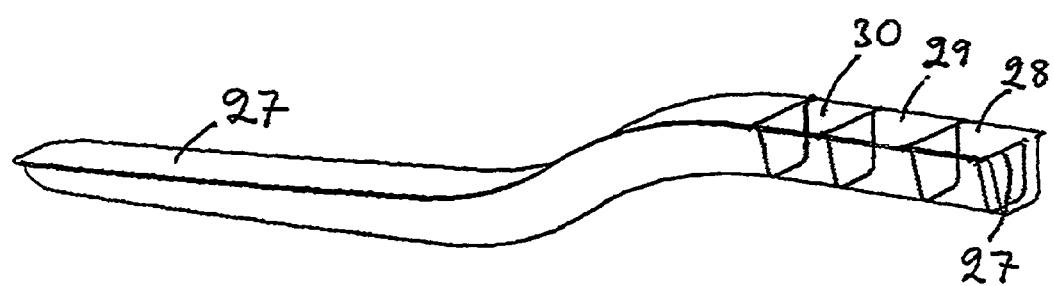
FIG. 2 shows a side rail according to FIG. 1, having a cover giving a closed profile.
Figure 1:
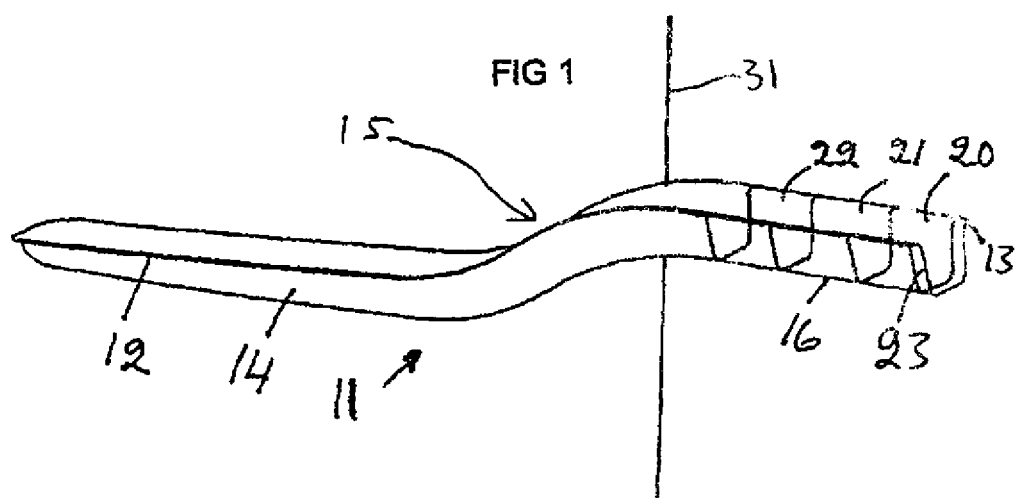
Figure 2:
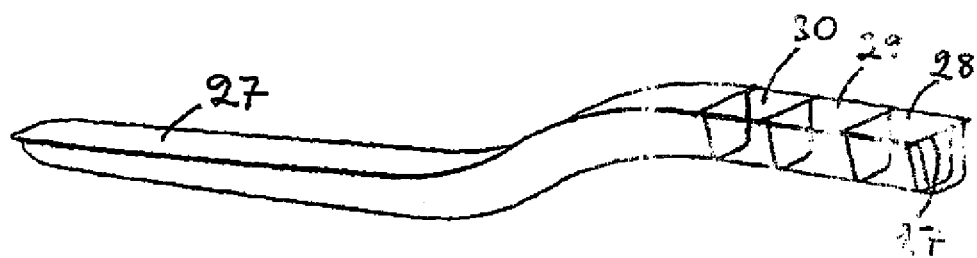

FIG. 2 shows the front end of a side rail 11 of the same type as that shown in FIG. 1, but in this example the side rail 11 has a flat high-strength cover 27 welded to the side flanges. The cover has soft portions 28, 29, 30 corresponding to the soft portions 20, 21, 22 of the side rail. The cover gives the side rail a closed profile, thereby giving the side rail a more stable cross section and making the S-bend 15 stronger. If the cover 27 is instead made of steel with lower strength, the entire cover can be designed with the same strength. The cover does not have to be flat and can for example be inwardly bent.

The example shows a side rail with three soft portions having different strength, wherein a portion closer to the end has lower strength than its nearest soft portion. Alternatively, there may be two or more than three soft portions.

The invention has been described by way of the example of a front side rail, but may also be applied to a rear side rail

The invention claimed is:
1. Side rail for vehicles having a tensile strength in excess of 1400 MPa, said side rail having one end (16) projecting from the safety cage of the vehicle and adapted to carry a bumper, characterised in that the end (16) projecting from the safety cage has lower strength with a yield point of less than 1000 MPa over a length of at least 0.4 m, said projecting end has an outermost portion (23) with a tensile strength in excess of 1400 MPa, and said projecting end has an outer section and an inner section, said inner section or said outer section including three or more portions that sequentially increase in tensile strength in a direction inwardly into the vehicle.

2. Side rail according to claim 1, characterised in that the outer section of said projecting end has a length of at least 0.2 m and a tensile strength below 800 MPa and the inner section of said projecting end has higher tensile strength than the outer section.

3. Side rail according to claim 1, characterised in that it is a front side rail and includes a vertical S-bend (15) behind the projecting end (16) and a rear portion (14) arranged to be welded to a bottom panel of a vehicle, both the rear portion and the S-bend having a tensile strength in excess of 1400 MPa.

4. Side rail according to claim 2, characterised in that it is a front side rail and includes a vertical S-bend (15) behind the projecting end (16) and a rear portion (14) arranged to be welded to a bottom panel of a vehicle, both the rear portion and the S-bend having a tensile strength in excess of 1400 MPa.

* * * * *

UNITED STATES PATENT AND TRADEMARK OFFICE
CERTIFICATE OF CORRECTION

| | | |
|---|---|---|
| PATENT NO. | : 8,382,199 B2 | |
| APPLICATION NO. | : 13/138827 | |
| DATED | : February 26, 2013 | |
| INVENTOR(S) | : Bodin | |

It is certified that error appears in the above-identified patent and that said Letters Patent is hereby corrected as shown below:

On the title page, illustrative figure 1 should be substituted with FIG. 1 on the attached replacement drawing sheet.

In the Specification

Column 1, line 61, delete "30" and insert --31--.

Signed and Sealed this
Eleventh Day of June, 2013

Teresa Stanek Rea
*Acting Director of the United States Patent and Trademark Office*